(12) United States Patent
Lin et al.

(10) Patent No.: US 10,249,291 B2
(45) Date of Patent: Apr. 2, 2019

(54) ANIMATION SYNTHESIS SYSTEM AND LIP ANIMATION SYNTHESIS METHOD

(71) Applicant: ASUSTeK COMPUTER INC., Taipei (TW)

(72) Inventors: Wei-Ting Lin, Taipei (TW); Tsung-Yu Hou, Taipei (TW); Min-Che Huang, Taipei (TW); Shih-Hao Ke, Taipei (TW); Shu-Hui Chou, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 32 days.

(21) Appl. No.: 15/603,446

(22) Filed: May 24, 2017

(65) Prior Publication Data

US 2017/0345201 A1 Nov. 30, 2017

Related U.S. Application Data

(60) Provisional application No. 62/342,206, filed on May 27, 2016.

(30) Foreign Application Priority Data

Feb. 14, 2017 (TW) .............................. 106104790 A

(51) Int. Cl.
*G10L 21/10* (2013.01)
*G10L 13/00* (2006.01)
(Continued)

(52) U.S. Cl.
CPC ............ *G10L 13/086* (2013.01); *G06F 3/167* (2013.01); *G06T 13/00* (2013.01); *G10L 13/08* (2013.01);
(Continued)

(58) Field of Classification Search
CPC ....... G06T 15/005; G06T 19/00; G06T 11/60; G06T 2210/44; G06T 13/40; G06T 13/00; G10L 15/22; G10L 13/07; G10L 13/08; G10L 21/10; G10L 13/086; G10L 2021/105; G10L 21/06; G10L 21/16;
(Continued)

(56) References Cited

U.S. PATENT DOCUMENTS 5,613,056 A * 3/1997 Gasper .................. G06T 13/205
                                                                345/473
6,181,351 B1 * 1/2001 Merrill .................... G10L 21/06
                                                                345/473
(Continued)

FOREIGN PATENT DOCUMENTS

| CN | 101968894 A | 2/2011 |
|---|---|---|
| CN | 101751692 B | 5/2012 |

*Primary Examiner* — Ke Xiao
*Assistant Examiner* — Andrew Shin
(74) *Attorney, Agent, or Firm* — CKC & Partners Co., LLC

(57) ABSTRACT

An animation display system is provided. The animation display system includes a display; a storage configured to store a language model database, a phonetic-symbol lip-motion matching database and a lip motion synthesis database; and a processor electronically connected to the storage and the display, respectively. The processor includes a speech conversion module, a phonetic-symbol lip-motion matching module, and a lip motion synthesis module. A lip animation display method is also provided.

8 Claims, 5 Drawing Sheets

(51) Int. Cl.
*G10L 13/08* (2013.01)
*G06T 13/00* (2011.01)
*G06F 3/16* (2006.01)

(52) U.S. Cl.
CPC ........ *G10L 21/10* (2013.01); *G10L 2021/105* (2013.01)

(58) Field of Classification Search
CPC ....... G10L 21/18; G10L 13/00; G10L 15/005; G10L 15/02; G10L 2015/022; G10L 2015/025; G10L 2015/027; G06F 3/167
USPC ............... 345/418, 419, 619, 646, 473, 475; 704/231, 251, 258, 267
See application file for complete search history.

(56) References Cited

U.S. PATENT DOCUMENTS

| | | | |
|---|---|---|---|
| 6,208,356 B1 * | 3/2001 | Breen | ........................ 345/473 |
| 6,470,316 B1 * | 10/2002 | Chihara | ................ G10L 13/033 704/260 |
| 2015/0012260 A1 * | 1/2015 | Chakladar | .......... G01C 21/3664 704/9 |

* cited by examiner

M1

M5

M2

M6

M3

M7

M4

M8

ANIMATION SYNTHESIS SYSTEM AND LIP ANIMATION SYNTHESIS METHOD

CROSS-REFERENCE TO RELATED APPLICATION

This application claims the priority benefit of U.S. provisional application Ser. No. 62/342,206, filed on May 27, 2016 and Taiwan application serial No. 106104790, filed on Feb. 14, 2017. The entirety of the above-mentioned patent applications are hereby incorporated by references herein and made a part of specification.

BACKGROUND OF THE INVENTION

Field of the Invention

The disclosure relates to an animation display system and, more specifically, to an animation display system for displaying a lip animation.

Description of the Related Art

In recent years, a robot is usually configured to broadcast a speech directly via a microphone and simulate the speech via the opening and closing of the robot mouth in an animation. However, the simulation effect of the animation for user lacks diversity and reality.

BRIEF SUMMARY OF THE INVENTION

According to an aspect of the disclosure, an animation display system is provided. The animation display system comprises: a display; a storage configured to store a language model database, a phonetic-symbol lip-motion matching database, and a lip motion synthesis database; and a processor electronically connected to the storage and the display; respectively. The processor includes: a speech conversion module configured to convert an input text into a combination of phonetic symbols and a timestamp that correspond to the input text according to the language model database; a phonetic-symbol lip-motion matching module configured to output a combination of lip movements that corresponds to the combination of the phonetic symbols according to the phonetic-symbol lip-motion matching database; and a lip motion synthesis module configured to generate a lip animation corresponding to the combination of the lip movements and the timestamp according to the lip motion synthesis database.

According to another aspect of the disclosure, a lip animation display method is provided. The lip animation display method comprises: converting an input text into a combination of phonetic symbols and a timestamp that correspond to the input text via a processor according to a language model database stored in a storage; outputting a combination of lip movements that corresponds to the combination of the phonetic symbols via the processor according to a phonetic-symbol lip-motion matching database stored in the storage; receiving the combination of the lip movements and the timestamp and generating a lip animation corresponding to the combination of the lip movements and the timestamp via the processor according to a lip motion synthesis database stored in the storage; and displaying the lip animation via a display.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1:
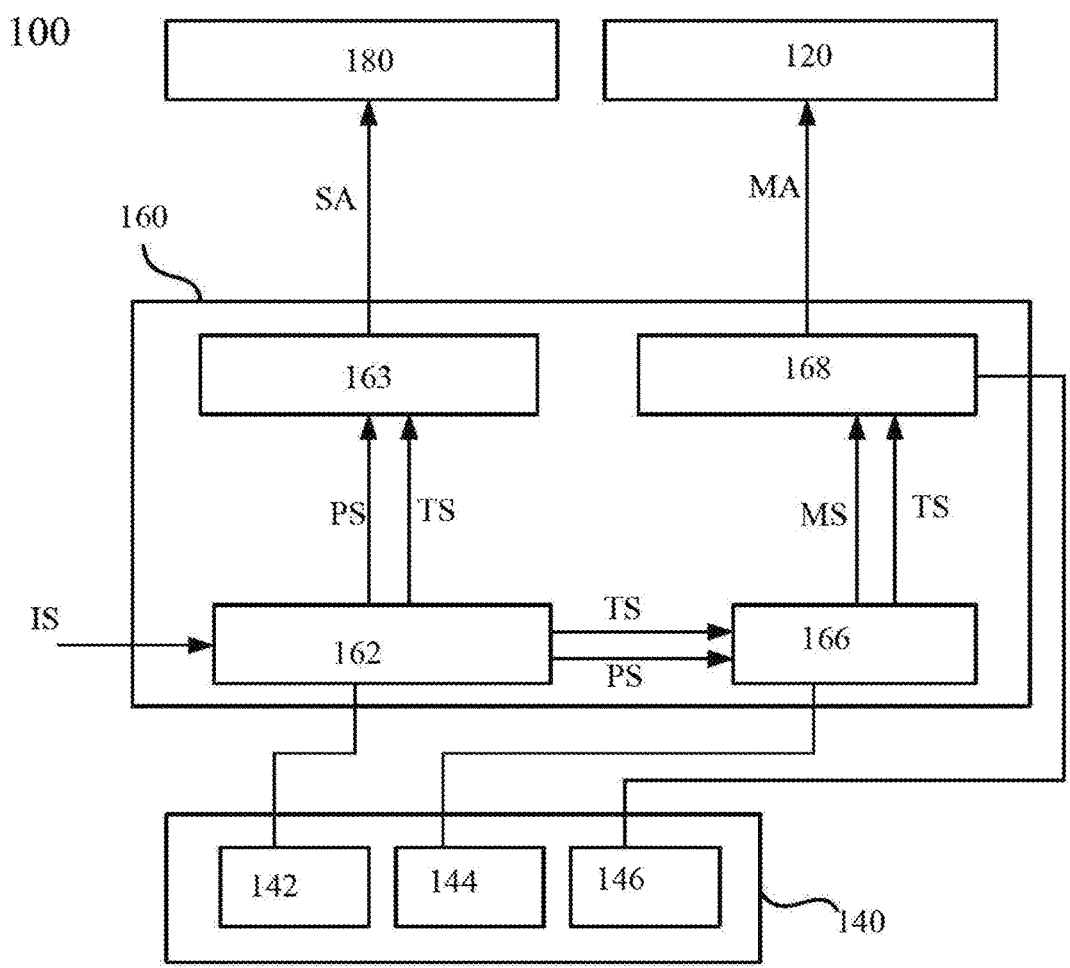
FIG. 1 is a schematic diagram showing an animation display system in an embodiment.

Please refer to FIG. 1. FIG. 1 is a schematic diagram showing an animation display system 100 in an embodiment. As shown in FIG. 1, in an embodiment, an animation display system 100 includes a display 120, a storage 140, a processor 160 and a speech output unit 180. In an embodiment, the display 120 is a liquid crystal display (LCD) or a LCD touch screen, which is not limited herein. In an embodiment, the speech output unit 180 is a speaker, which is not limited herein. In an embodiment, the storage 140 is a memory or a hard disk. The storage 140 is used for storing a language model database 142, a phonetic-symbol lip-motion matching database 144, a lip motion synthesis database 146 and at least a computer executable command. In an embodiment, the animation display system 100 is applied to a robot. When the robot outputs a speech via the speech output unit 180, the animation display system 100 generates a lip animation corresponding to the speech and displays the lip animation via the display 120 synchronously. As a result, a speech-lip synchronization is achieved.

In an embodiment, the processor 160 is a central processing module (CPU) or a microprocessor (MCU), which is not limited herein. As shown in FIG. 1, the processor 160 is electronically connected to the display 120 and the storage 140. In an embodiment, the processor 160 includes a speech conversion module 162, a speech synthesis module 163, a phonetic-symbol lip-motion matching module 166 and a lip motion synthesis module 168.

While executing the computer executable commands that are stored in the storage 140, the processor 160 is configured to execute a lip animation display method with the cooperation of the speech conversion module 162, the phonetic-symbol lip-motion matching module 166 and the lip motion synthesis module 168, to generate a lip animation and display the lip animation via the display 120.

Figure 2:
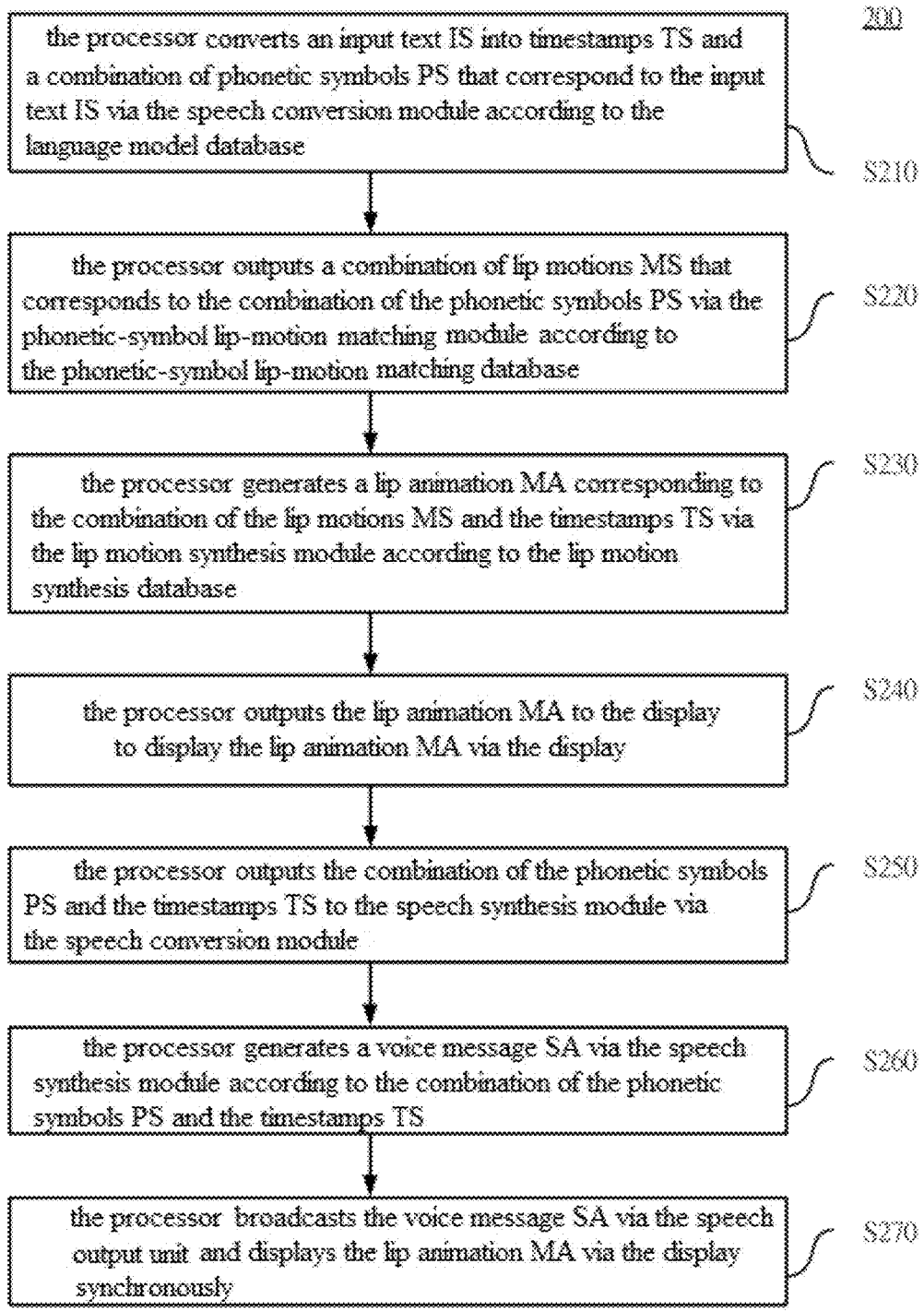
FIG. 2 is a schematic diagram showing a lip animation display method in an embodiment.

Please refer to FIG. 2. FIG. 2 is a schematic diagram showing a lip animation display method 200 in an embodiment. In an embodiment, a lip animation display method 200 is executed by the processor 160 in FIG. 1 when the processor 160 executes the computer executable commands that are stored in the storage 140. The lip animation display method 200 is described accompanying with the animation display system 100 in FIG. 1, which is not limited herein.

As shown in FIG. 2, in an embodiment, the lip animation display method 200 includes steps S210, S220, S230 and S240. In step S210, the processor 160 is configured to convert an input text IS into timestamps TS and a combination of phonetic symbols PS that correspond to the input text IS via the speech conversion module 162 according to the language model database 142.

In an embodiment, the language model database 142 includes a plurality of text models. The text model includes a phonetic symbol(s) for each character and a timestamp(s) for the phonetic symbol(s). The phonetic symbol is a smallest unit of pronunciation. In an embodiment, according to the International Phonetic Alphabet (IPA), the phonetic symbols for a Chinese text "我愛你" are "uo ai ni". The phonetic symbols for the English text "I LOVE YOU" are "ai lʌv ju". In an embodiment, the speech conversion module 162 is configured to convert the input text IS into the corresponding combination of the phonetic symbols PS and timestamps TS according to the phonetic symbols for different languages that are stored in the language model database 142.

In an embodiment, in step S210, the speech conversion module 162 analyzes the language of the input text and converts the input text into the corresponding combination of the phonetic symbols PS and timestamps TS based on the language of the input text according to the language model database 142. Therefore, the input text in multiple different languages, such as Chinese, English and German, is recognized and converted into the corresponding combination of the phonetic symbols PS and timestamps TS according to the language via the speech conversion module 162.

In embodiments, the combination of the phonetic symbols PS converted by the speech conversion module 162 belongs to different phonetic symbol systems. In an embodiment, the combination of the phonetic symbols PS belongs to the TAP system. In an embodiment, the combination of the phonetic symbols PS belongs to the Daniel Jones (DJ) phonetic symbol system, or the KK (Kenyon and Knott) phonetic symbol system, which is not limited herein.

In step S220, the processor 160 is configured to output a combination of lip movements MS that corresponds to the combination of the phonetic symbols PS via the phonetic-symbol lip-motion matching module 166 according to the phonetic-symbol lip-motion matching database 144.

In an embodiment, the input text IS is an English text "I LOVE YOU", and the corresponding combination of the phonetic symbols PS output by the speech conversion module 162 is the international phonetic symbols "ai lʌv ju". The combination of the phonetic symbols PS include a plurality of the phonetic symbols "a", "i", "l", "ʌ", "v", "j", and "u".

The phonetic-symbol lip-motion matching module 166 is configured to find candidate lip movements M1~M8 corresponding to the phonetic symbols from the phonetic-symbol lip-motion matching database 144. The phonetic-symbol lip-motion matching module 166 is configured to output the combination of the lip movements MS that corresponds to the combination of the phonetic symbols PS.

Figure 3:
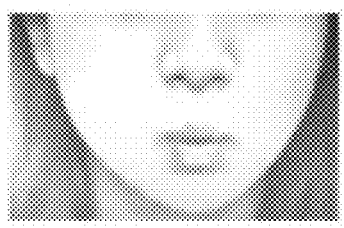
FIG. 3 is a schematic diagram showing candidate lip movements in an embodiment.
Figure 3:
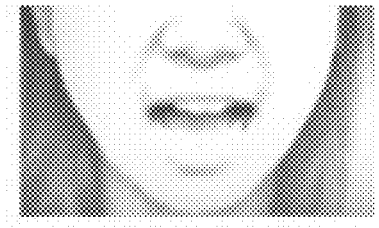
Figure 3:
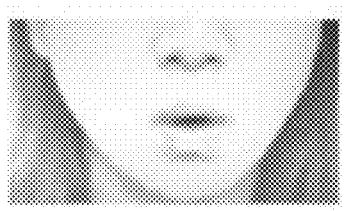
Figure 3:
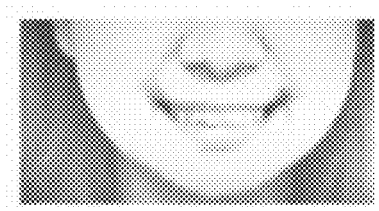
Figure 3:
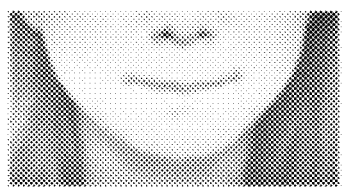
Figure 3:
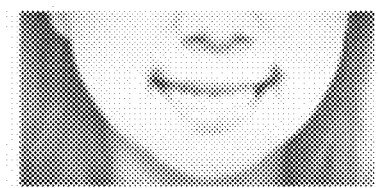
Figure 3:
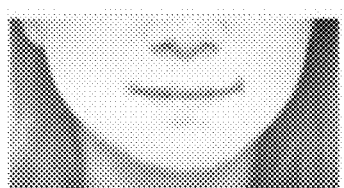
Figure 3:
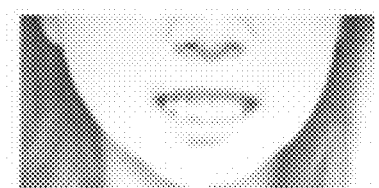

Please refer to FIG. 3. FIG. 3 is a schematic diagram showing candidate lip movements M1~M8 in an embodiment. In an embodiment, in the phonetic-symbol lip-motion matching database 144, vowels in the phonetic symbols correspond to one of the candidate lip movements M1~M8, respectively. The vowels are classified according to the (front, back, high or low) position of articulation and the labialization.

In an embodiment, the close vowels [y], [ʉ], [u] and the near-close vowels [ʏ], [ʊ], [ʊ] in the rounded vowels correspond to the candidate lip motion M1 in FIG. 3, respectively. The close-mid vowels [ø], [ɵ], [o], the mid vowels [ɵ], [ɞ], the open-mid vowels [œ], [ɜ], [ɔ] in the rounded vowels correspond to the candidate lip motion M2 in FIG. 3, respectively. The close central vowel [ɨ], the close back vowel [ɯ] and the near-close vowels [ɪ], [ɪ̈] in the unrounded vowels correspond to the candidate lip motion M8 in FIG. 3, respectively. The close front vowel [i], the close-mid vowels [e], [ɘ], [ɤ] and the mid vowels [ɛ], [ɜ], [ɤ] in the unrounded vowels correspond to the candidate lip motion M6 in FIG. 3, respectively. The open-mid vowels [ɛ], [ɜ], [ʌ] in the unrounded vowels correspond to the candidate lip motion M7 in FIG. 3, respectively. The near-open vowels [æ], [ɐ] and the open vowels [a], [ɶ], [ä], [ɒ], [ɑ] (when these vowels are pronounced, the tongue is at a lower position) in the rounded or unrounded vowels correspond to the candidate lip motion M5 in FIG. 3, respectively.

In an embodiment, some consonants in the phonetic symbols correspond to one of the candidate lip movements M1~M8 in the phonetic-symbol lip-motion matching database 144, respectively. In an embodiment, the bilabial nasal [m], the voiced bilabial plosive[b] and the voiceless bilabial plosive [p] (which belongs to the bilabial plosive) correspond to the candidate lip motion M3 in FIG. 3, respectively. The voiced labiodental fricative and the voiceless labiodental fricative [f] (which belongs to the labiodental fricative) correspond to the candidate lip motion M4 in FIG. 3, respectively. The rest of the consonants do not correspond to any specific candidate lip motion.

Thus, the phonetic-symbol lip-motion matching module 166 outputs the combination of the lip movements MS according to the candidate lip movements that correspond to the phonetic symbols. That is, the combination of the lip movements MS includes the candidate lip movements M1~M8 that correspond to the phonetic symbols.

In an embodiment, according to the phonetic-symbol lip-motion matching database 144, "a" in the combination of the phonetic symbols "ai lʌv ju" corresponds to the candidate lip motion M5. "i" corresponds to the candidate lip motion M6. "l" does not correspond to any specific candidate lip motion. "ʌ" corresponds to the candidate lip motion M7. "v" corresponds to the candidate lip motion M4. "j" does not correspond to any specific candidate lip motion. "u" corresponds to the candidate lip motion M1. Thus, the phonetic-symbol lip-motion matching module 166 outputs the combination of the lip movements MS that includes the candidate lip movements M5, M6, M7, M4 and M1.

The correspondence relationship described above is only an exemplified embodiment, which is not used for limiting the disclosure. The number of the candidate lip movements is various in embodiments. A correspondence relationship between the candidate lip movements and the phonetic symbols in the phonetic-symbol lip-motion matching database 144 is various in embodiments. Thus, the phonetic-symbol lip-motion matching module 166 outputs the combination of the lip movements MS according to the requirements.

Then, in step S230, the processor 160 is configured to generate a lip animation MA corresponding to the combination of the lip movements MS and the timestamps TS via the lip motion synthesis module 168 according to the lip motion synthesis database 146.

In an embodiment, the lip motion synthesis database 146 includes a conversion rule for combining the candidate lip movements M1~M8. Therefore, the lip motion synthesis module 168 is configured to synthesize the combination of the lip movements MS and the timestamps TS to generate the lip animation MA according to the conversion rule in the lip motion synthesis database 146. In an embodiment, the lip motion synthesis module 168 generates a lip animation MA corresponding to the text "I LOVE YOU" based on the candidate lip movements M5, M6, M7, M4 and M1 and the timestamps TS.

In step S240, the processor 160 is configured to output the lip animation MA to the display 120. The display 120 displays the lip animation MA.

As shown in FIG. 2, in an embodiment, the lip animation display method 200 further includes steps S250, S260 and S270. In step S250, the processor 160 is configured to output the combination of the phonetic symbols PS and the timestamps TS to the speech synthesis module 163 via the speech conversion module 162. Then, in step S260, the processor 160 is configured to generate a voice message SA via the speech synthesis module 163 according to the combination of the phonetic symbols PS and the timestamps TS. In step S270. The processor 160 is configured to broadcast the voice message SA via the speech output unit 180 and display the lip animation MA via the display 120 synchronously.

The voice message SA broadcast by the speech output unit 180 and the lip animation MA displayed by the display 120 are generated based on the same timestamps TS. Therefore, the voice message SA and the lip animation MA are matched with each other to achieve the synchronization of the speech and the lip motion in the animation.

Figure 4:
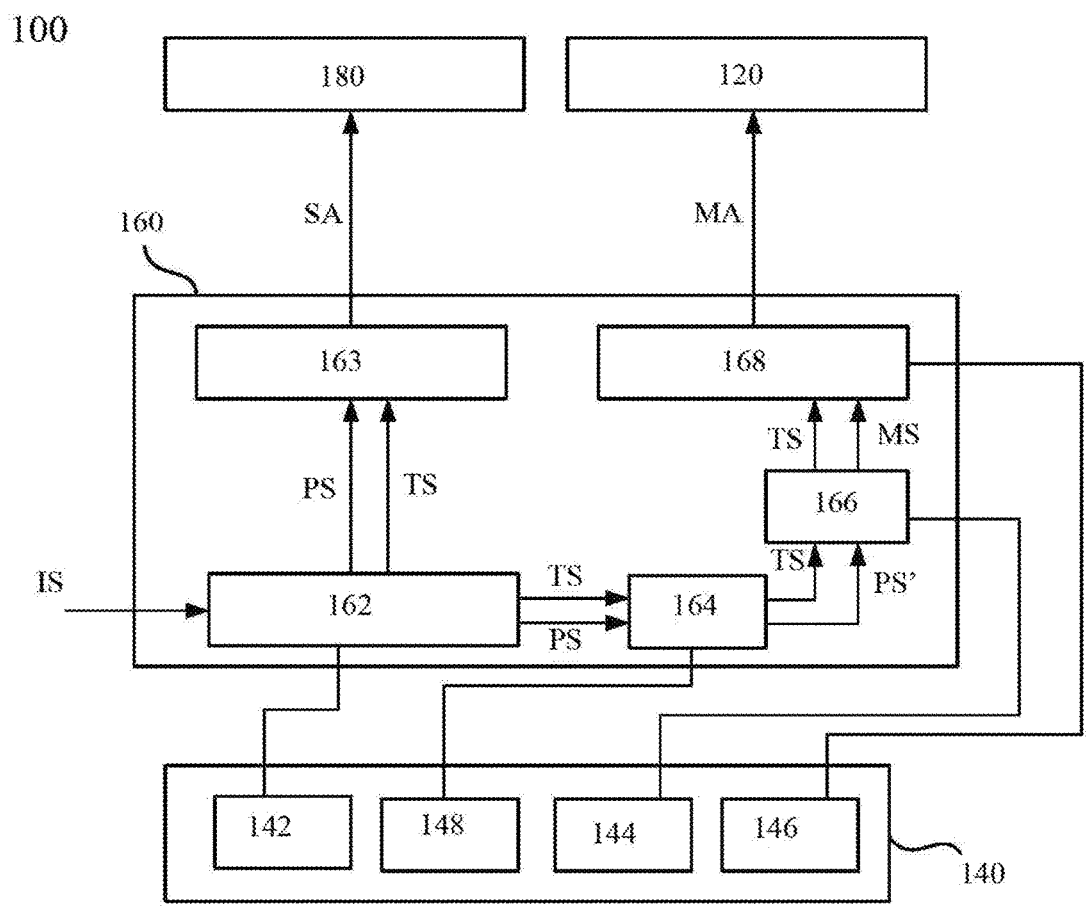
FIG. 4 is a schematic diagram showing an animation display system in an embodiment.

Please refer to FIG. 4. FIG. 4 is a schematic diagram showing an animation display system 100 in an embodiment. In FIG. 4, the component same/similar to that in FIG. 1 is denoted by the same reference symbol. Details for the same/similar component are described above, which is not repeated herein.

As show in FIG. 4, in an embodiment, the storage 140 is further used for storing a phonetic symbol conversion database 148. As described above, the speech conversion module 162 outputs the combination of the phonetic symbols PS that belong to the international phonetic symbol system, the DJ phonetic symbol system, or the KK phonetic symbol system. Conversion relationships between any two of the phonetic symbol systems are stored in the phonetic symbol conversion database 148.

In an embodiment, the processor 160 is further configured to include a phonetic symbol conversion module 164. The phonetic symbol conversion module 164 is configured to convert the combination of the phonetic symbols PS output by the speech conversion module 162 into a standard combination of the phonetic symbols PS' according to the phonetic symbol conversion database 148. The phonetic symbol conversion module 164 outputs the standard combination of the phonetic symbols PS' to the phonetic-symbol lip-motion matching module 166.

Figure 5:
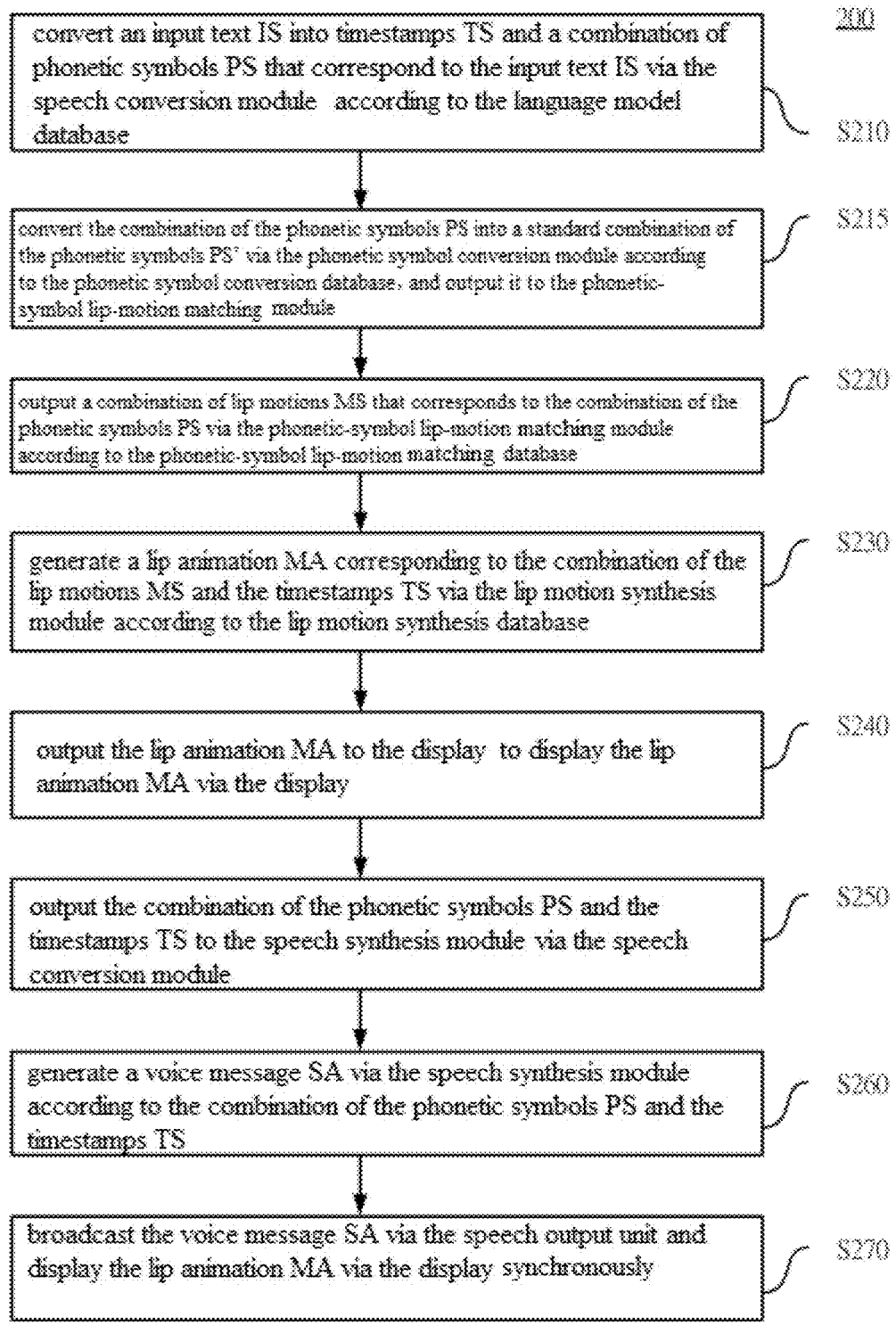
FIG. 5 is a schematic diagram showing a lip animation display method in an embodiment.

Please refer to FIG. 5. FIG. 5 is a schematic diagram showing a lip animation display method 200 in an embodiment. In an embodiment, a lip animation display method 200 is executed by the processor 160 in FIG. 4 when the processor 160 executes the computer executable commands stored in the storage 140. The lip animation display method 200 is described accompanying with the animation display system 100, which is not limited herein.

Compared with the lip animation display method 200 in FIG. 2, the lip animation display method 200 in FIG. 5 further includes a step S215 between the steps S210 and S220. In step S215, the processor 160 is configured to convert the combination of the phonetic symbols PS output by the speech conversion module 162 into a standard combination of the phonetic symbols PS' via the phonetic symbol conversion module 164 according to the phonetic symbol conversion database 148. The standard combination of the phonetic symbols PS' is output to the phonetic-symbol lip-motion matching module 166. Therefore, in step S220, the processor 160 is configured to output the combination of the lip movements MS that corresponds to the standard combination of the phonetic symbols PS' via the phonetic-symbol lip-motion matching module 166 according to the phonetic-symbol lip-motion matching database 144.

When the type of the combination of the phonetic symbols PS output by the speech conversion module 162 in step S210 is different from the type of the phonetic symbols used in the phonetic-symbol lip-motion matching module 166 in step S220, the processor 160 converts the combination of the phonetic symbols PS in different types into the standard combination of the phonetic symbols PS' via the phonetic symbol conversion module 164. Thus, the phonetic-symbol lip-motion matching module 166 outputs the corresponding combination of the lip movements MS based on the standard combination of the phonetic symbols PS'.

In the embodiment, the step S220 further includes steps of matching a plurality of the phonetic symbols in the combination of the phonetic symbols PS' with any one of the candidate lip movements M1~M8 via the phonetic-symbol lip-motion matching module 166 according to the phonetic-symbol lip-motion matching database 144, and outputting the combination of the lip movements MS that includes the candidate lip movements M1~M8 (which correspond to the phonetic symbols, respectively) via the phonetic-symbol lip-motion matching module 166. Details for the steps are described above, which is not repeated herein.

In embodiments, the processor 160 is configured to operate with any speech conversion module 162 for a specific type of the phonetic symbols, to broadcast the voice message SA by the speech output unit 180 and display the lip animation MA by the display 120 synchronously.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. An animation display system comprising:
a display;
a storage configured to store a language model database, a phonetic-symbol lip-motion matching database, and a lip motion synthesis database; and
a processor electronically connected to the storage and the display, respectively, the processor includes:
a speech conversion module configured to analyze a language of an input text, and convert the input text into a combination of phonetic symbols and a timestamp based on the language of the input text according to the language model database;
a phonetic-symbol lip-motion matching module configured to output a combination of lip movements that corresponds to the combination of the phonetic symbols according to the phonetic-symbol lip-motion matching database; and
a lip motion synthesis module configured to generate a lip animation corresponding to the combination of the lip movements and the timestamp according to the lip motion synthesis database;
wherein the language of the input text is a country language which is related to a system of communication used by a particular country, and the speech conversion module recognizes the country language of the input text before converting the input text into the combination of phonetic symbols and the timestamp based on the language of the input text, and wherein the storage is further configured to store a phonetic symbol conversion database, the processor further includes a phonetic symbol conversion module, the phonetic symbol conversion module is configured to convert the combination of the phonetic symbols into a standard combination of the phonetic symbols according to the phonetic symbol conversion database, and the combination of the lip movements is output according to the standard combination of the phonetic symbols, wherein a type of the combination of phonetic symbols output by the speech conversion module may correspond to a same or different phonetic symbol system with respect to a type of the combination of phonetic symbols used in the phonetic-symbol lip-motion matching module; and wherein the phonetic symbol conversion module is configured to convert the combination of the phonetic symbols into a standard combination of the phonetic symbols belonging to the same phonetic symbol system according to the phonetic symbol conversion database and in response to the type of the combination of phonetic symbols output by the speech conversion module being different from the type of the phonetic symbols used in the phonetic-symbol lip-motion matching module.

2. The animation display system according to claim 1, wherein the animation display system further includes a speech output unit, and the processor further includes a speech synthesis module, the speech synthesis module is configured to generate a voice message according to the combination of the phonetic symbols and the timestamp, and the voice message is broadcast by the speech output unit and the lip animation is displayed by the display synchronously.

3. The animation display system according to claim 1, wherein the standard combination of the phonetic symbols includes a plurality of the phonetic symbols, a vowel in the phonetic symbols corresponds to one of a plurality of candidate lip movements in the phonetic-symbol lip-motion matching database, and the combination of the lip movements includes the candidate lip movements that correspond to the phonetic symbols.

4. The animation display system according to claim 3, wherein part of consonants in the phonetic symbols selectively correspond to one of the candidate lip movements in the phonetic-symbol lip-motion matching database, respectively.

5. The animation display system according to claim 1, wherein the combination of the phonetic symbols belongs to the International Phonetic Alphabet system, the Daniel Jones phonetic symbol system, or the Kenyon and Knott phonetic symbol system.

6. A lip animation display method comprising:
analyzing a language of an input text;
converting the input text into a combination of phonetic symbols and a timestamp based on the language of the input text via a processor according to a language model database stored in a storage;
converting the output combination of the phonetic symbols into a standard combination of phonetic symbols via the processor according to a phonetic symbol conversion database stored in the storage;
outputting a combination of lip movements that corresponds to the standard combination of the phonetic symbols via the processor according to a phonetic-symbol lip-motion matching database stored in the storage;
receiving the combination of the lip movements and the timestamp and generating a lip animation corresponding to the combination of the lip movements and the timestamp via the processor according to a lip motion synthesis database stored in the storage; and
displaying the lip animation via a display;
wherein the language of the input text is a country language which is related to a system of communication used by a particular country, and the speech conversion module recognizes the country language of the input text before converting the input text into the combination of phonetic symbols and the timestamp based on the language of the input text,
wherein a type of the combination of phonetic symbols converted from the input text by the processor may correspond to a same or different phonetic symbol system with respect to a type of the combination of phonetic symbols used for outputting the combination of lip movements; and
wherein the processor is configured to convert the combination of the phonetic symbols into a standard combination of the phonetic symbols belonging to the same phonetic symbol system according to the phonetic symbol conversion database and in response to the type of the combination of phonetic symbols converted from the input text by the processor being different from the type of the phonetic symbols used for outputting the combination of lip movements.

7. The lip animation display method according to claim 6, wherein the step of outputting the combination of the lip movements includes:
matching a plurality of the phonetic symbols in the standard combination of the phonetic symbols with one of the candidate lip movements, respectively, according to the phonetic-symbol lip-motion matching database; and
outputting the combination of the lip movements including the candidate lip movements that correspond to the phonetic symbols.

8. The lip animation display method according to claim 6, wherein the lip animation display method further includes:
generating a voice message according to the combination of the phonetic symbols and the timestamp; and
broadcasting the voice message by the speech output unit and displaying the lip animation by the display synchronously.

* * * * *